United States Patent [19]

Torii et al.

[11] 4,418,311
[45] Nov. 29, 1983

[54] BATTERY CHARGE INDICATING SYSTEM

[75] Inventors: Koshi Torii, Iwakura; Toshinori Maruyama, Kariya; Yoshio Akita, Chiryu; Takanori Teshima, Kariya, all of Japan

[73] Assignee: Nippondenso Co., Ltd., Kariya, Japan

[21] Appl. No.: 338,056

[22] Filed: Jan. 8, 1982

[30] Foreign Application Priority Data

Feb. 18, 1981 [JP] Japan .................................. 56-21421

[51] Int. Cl.³ .............................................. H02J 7/24
[52] U.S. Cl. ........................................ 320/48; 322/28
[58] Field of Search ....................... 320/39, 40, 48, 61, 320/64; 322/28

[56] References Cited

U.S. PATENT DOCUMENTS 3,624,482 11/1971 Ruff et al. .............................. 320/48

Primary Examiner—William M. Shoop
Assistant Examiner—Anita M. Ault
Attorney, Agent, or Firm—Cushman, Darby & Cushman

[57] ABSTRACT

In a battery charge indicating system, there are provided detecting means of an npn-transistor for detecting a closed condition of an ignition switch, and switching means of a pnp-transistor for supplying a base current to a driving transistor in response to an output of the detecting means, so that the driving transistor is made conductive when the ignition switch is closed and a generator is not generating its output. The emitter of the pnp-transistor is connected to a battery not through a current supply terminal for a voltage regulator, whereby even when the current supply terminal is accidentally disconnected from the regulator, the driving transistor is made conductive so that an indicating lamp is activated to indicate that the generator is not in the operation condition.

13 Claims, 2 Drawing Figures

BATTERY CHARGE INDICATING SYSTEM

BACKGROUND OF THE INVENTION

The present invention relates to a battery charge indicating system for an automobile, which detects an operation of an alternating current generator and indicates to a driver when the generator stops generating the output.

DESCRIPTION OF PRIOR ART

Figure 1:
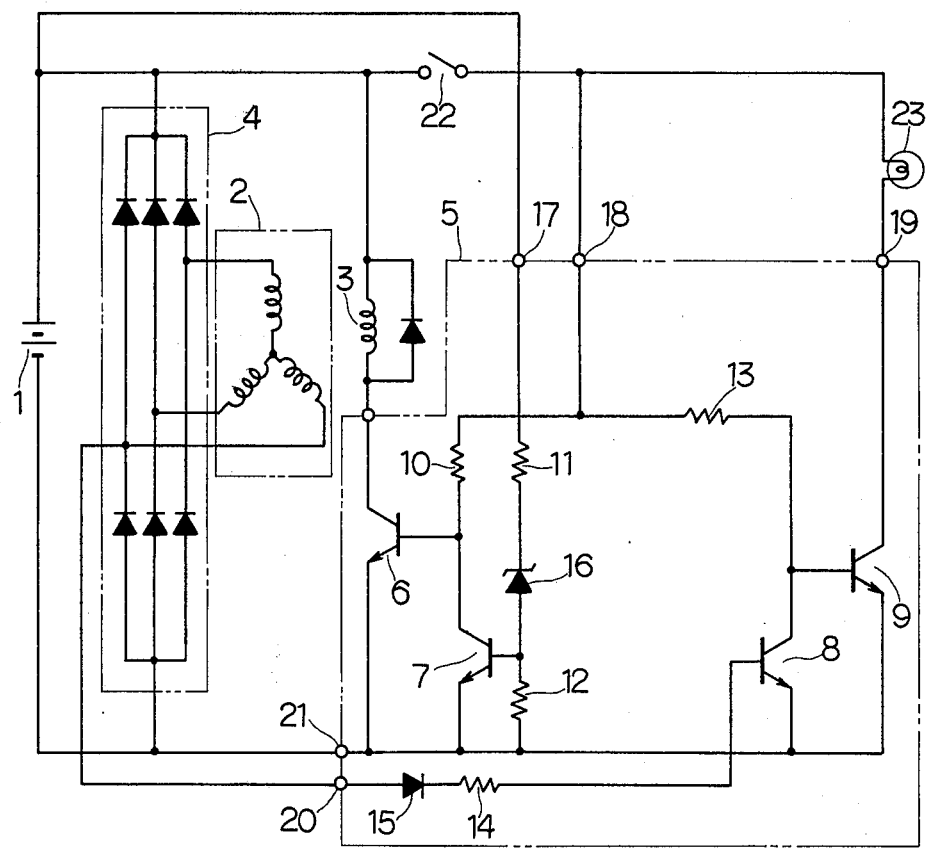
FIG. 1 is an electric wiring diagram of a conventional battery charge indicating system.

In FIG. 1 showing a conventional battery charge indicating system, numeral 1 designates a battery, numeral 2 output windings of an alternating current generator, numeral 3 a field winding of the generator, and numeral 4 a full-wave rectifier for rectifying alternating currents from the output windings 2. Numeral 5 designates a voltage regulator which comprises transistors 6 to 9, resistors 10 to 14, a diode 15 and a Zener diode 16 and whose terminals 17 to 21 are connected to electrical parts (not shown). Numeral 22 is an ignition key switch and numeral 23 is an indicating lamp for indicating an operation condition where the generator stops generating its electrical output.

The operation of the above described conventional system is as follows: When the ignition key switch 22 is closed, a starter motor (not shown) is driven to start up an engine (not shown) and then the alternating current generator driven by the engine starts to generate and to charge its output to the battery 1. On the other hand, when the ignition switch 22 is closed, a base current is supplied to the base of the transistor 6 through the resistor 10 in a case where the transistor 7 is not conductive. The transistor 7 is made conductive when the battery voltage is higher than a preset value. With the conduction of transistor 6, the field current flows through the field winding 3, so that the output voltage of the generator becomes higher. When the battery voltage becomes higher than the preset value, transistor 6 is driven into non-conductive state to cut off the field current, so that the output voltage of the generator decreases.

Repeating the above operation, the battery voltage is controlled at the preset value. When the ignition switch 22 is closed, but the generator does not generate its output, the transistor 8 remains in a non-conductive state, so that the transistor 9 is made conductive by a base current through the ignition switch 22 and the resistor 13, wherein the lamp 23 is activated to indicate that the generator is not in an operation.

In this conventional system, when the terminal 18 is disconnected from a conductor connected to the ignition key switch 22, the transistor 6 is not driven into the conductive state, even though the ignition switch 22 is closed to operate the engine. Therefore, the generator does not start to generate its output. The base current is not supplied to the transistor 9 in this condition so that it remains in the non-conductive state. As a result, the lamp 23 cannot be activated, although the generator is not in the operation condition of generating the output current while the ignition switch 22 is closed.

SUMMARY OF THE INVENTION

An object of the present invention is to remove the above described drawback and to provide a battery charge indicating system, which comprises detecting means for detecting a closed or opened condition of an ignition switch, switching means operative in response to a detected condition of the detecting means, and a voltage regulator for controlling an output voltage of an alternating current generator (or a battery voltage) at a predetermined value, wherein an indicating lamp can be activated to indicate that the generator is not in an operating condition even though a current supply terminal of the voltage regulator for supplying the current from a battery to the regulator is disconnected.

The other objects and features of the present invention will become apparent from the following description in conjunction with the drawing.

DETAILED DESCRIPTION OF THE PREFERRED EMBODIMENT

Figure 2:
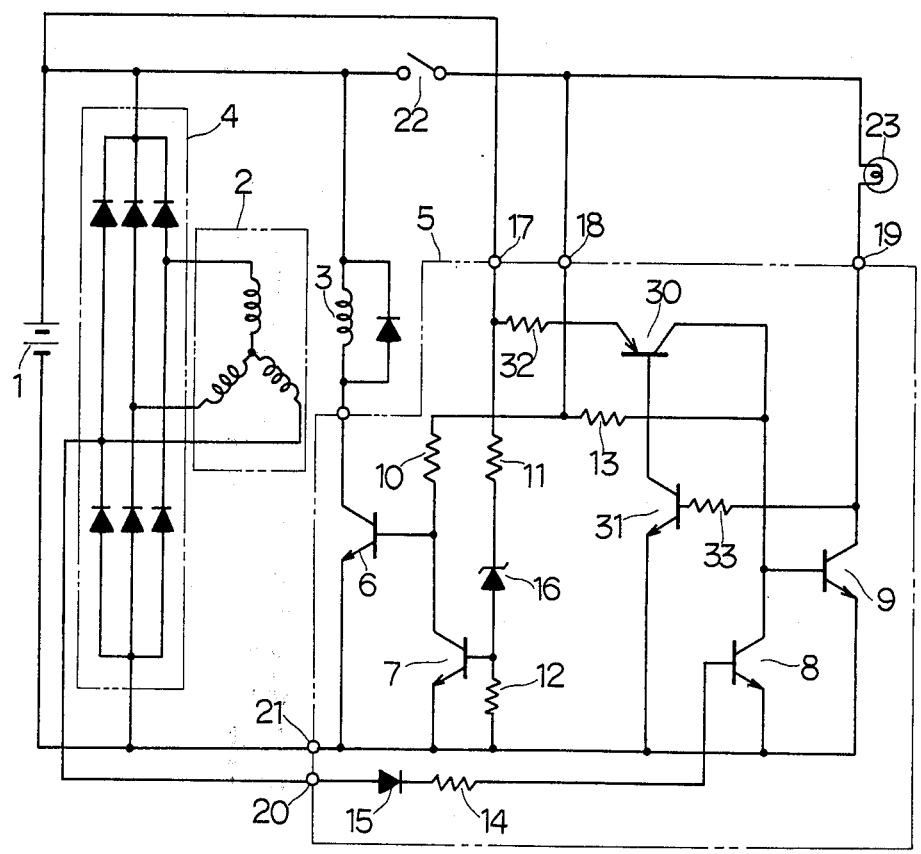
FIG. 2 is an electric wiring diagram of a battery charge indicating system according to the present invention.

In FIG. 2 showing an embodiment of a battery charge indicating system according to the present invention, the same reference numerals designate the same or similar elements which are explained in the prior art with reference to FIG. 1. Numeral 30 designates a pnp-transistor acting as switching means, whose emitter is connected to the terminal 17 through a resistor 32, whose base is connected to collector of an npn-transistor 31 acting as detecting means which detects a closed or opened condition of the ignition key switch 2, and whose collector is connected to the base of the transistor 9. The base of the transistor 31 is connected to the collector of the transistor 9 through a resistor 33, while the emitter thereof is connected to the grounded terminal of the battery 1.

An operation of the above described embodiment will be hereinafter explained. When the ignition switch 22 is closed to start an engine (not shown), a base current is supplied to the transistor 31 from the battery 1 through the closed ignition switch 22, the indicating lamp 23 and the resistor 33, so that the transistor 31 is made conductive. Since the base current flowing through the lamp 23 is small, the lamp 23 is not activated in this state. When the transistor 31 is in the conductive state, the transistor 30 is also made conductive, thereby to supply a base current to the transistor 9 through the resistor 32 and the emitter-collector path of the transistor 30. So long as the generator does not generate its output, the transistor 8 remains in the non-conductive state, so that the transistor 9 is driven into the conductive state by the base current. Consequently the lamp 23 is activated to indicate that the generator is not generating its output although the ignition switch 22 is closed.

When the battery voltage detected by resistors 11 and 12 and the Zener diode 16 is lower than the preset value, the transistor 7 is in the non-conductive state, so that the base current is supplied to the transistor 6 through the resistor 10 to drive it into conductive. Therefore, the field current flows through the field winding 3 and the generator begins to generate its output. Since the output of the generator is supplied to the base of the transistor 8 through the diode 15 and the resistor 14, the transistor 8 is driven into a conductive state and then the transistor 9 is driven into a non-conductive state to stop the current and turn off lamp 23. When the battery voltage rises and becomes higher than the preset value, the transistor 7 is made conductive and the transistor 6 is thereby made non-conductive, so that the field current is cut off. Repeating the above operation, the battery voltage is controlled at the preset value.

When the terminal 18 of the voltage regulator 5 is disconnected from a conductor connected to the ignition key switch 22, the transistor 6 is not driven into a conductive state even when the ignition switch 22 is closed, so that the generator does not generate its output. The transistor 31 acting as detecting means is on the other hand driven into the conductive state when the ignition switch 22 is closed, so that the transistor 30 is also made conductive. Then the transistor 9 is supplied with the base current and is driven into the conductive state. Even when the transistor 9 is made conductive, the transistor 31 remains in the conductive state, since the collector voltage $V_c$ at the collector of the transistor 9 is higher than the base voltage $V_b$ of the transistor 31. As a result, the transistor 9 is kept in the conductive state to indicate by the lamp 23 that the generator is not generating its output even though the ignition switch 22 is closed.

As described above, there are provided in the present invention detecting means for detecting the closed condition of the ignition switch and switching means for driving the transistor into the conductive state in response to the output signal from the detecting means, whereby it can be indicated that the generator is not generating its output even when the current supply line is disconnected from the voltage regulator.

What we claim is:

1. A battery charge indicating system comprising:
   an alternating current generator including output windings, a field winding and a full-wave rectifier connected to said output windings for rectifying the output therefrom;
   a battery connected to said generator and charged thereby;
   a voltage regulator unit connected to said generator and said battery for controlling the output of said generator in response to the battery voltage;
   indicating means connected to said battery through an ignition key switch;
   wherein said voltage regulator unit includes;
   power switching means connected to said battery through said field winding;
   voltage sensing means connected to said battery through a first terminal of said voltage regulator unit;
   a current supplying line, connected to said battery through a second terminal of said voltage regulator unit and said ignition key switch, for supplying a current to said power switching means when said voltage sensing means senses that the voltage of said battery is lower than a preset value;
   driving means, connected to said battery thrugh said indicating means and said ignition key switch and through a third terminal of said voltage regulator unit, for driving said indicating means;
   detecting means connected to said battery through said third terminal for detecting a closed condition of said ignition key switch; and
   switching means connected to said battery through said first terminal and to said detecting means for supplying a signal to said driving means in response to an output of said detecting means indicative of the closed condition of said ignition key switch;
   said driving means being also connected to said generator and driving said indicating means when said generator is not generating its output and said driving means is supplied with said signal from said switching means.

2. A battery charge indicating system according to claim 1, wherein said driving means comprises:
   a first transistor (9) whose collector-emitter path is connected to said battery through said indicating means and said ignition key switch; and
   a second transistor (8) whose collector is connected to the base of said first transistor, the base of said second transistor being connected to said generator.

3. A battery charge indicating system according to claim 2, wherein said detecting means comprises
   an npn-transistor whose base is connected to the collector of said first transistor, and
   said switching means comprises a pnp-transistor whose base is connected to the collector of said npn-transistor, the collector of said pnp-transistor being connected to the base of said first transistor and the emitter of said pnp-transistor being connected to said battery.

4. A battery charge indicating system comprising:
   an alternating current generator;
   a battery connected to said generator to be charged thereby;
   an ignition key switch connected to said battery;
   indicating means connected to said ignition key switch to be connected to said battery through said ignition key switch;
   first conductor means connected to said battery and bypassing said ignition key switch;
   second conductor means connected to a point between said ignition key switch and said indicating means to be connected to said battery through said ignition key switch;
   generator control means connected to said second conductor means and said generator for controlling said generator with electric current supplied from said second conductor means upon closure of said ignition key switch;
   circuit means connected to said ignition key switch through said indicating means and to said first conductor means for producing an output signal when said ignition key switch is closed; and
   driving means connected to said circuit means and said generator and to said indicating means for activating said indicating means when said generator fails to generate an output while said circuit means generates said output signal, whereby said driving means activates each indicating means even if said generator control means is disconnected from said second conductor means and said generator fails to generate the output upon closure of said ignition key switch.

5. A battery charge indicating system according to claim 4, wherein said circuit means comprises:
   detecting means connected to said ignition key switch through said indicating means for producing a detection signal when said ignition key switch is closed; and
   switching means connected to said first conductor means and said detecting means for producing said output signal in response to said detection signal of said detecting means.

6. A battery charge indicating system according to claim 5, wherein said detecting means comprises a first transistor the base of which is connected to said ignition key switch through said indicating means to be rendered conductive when said ignition key switch is closed and said switching means comprises a second transistor the base of which is connected to the collector of said first transistor to be rendered conductive when said first transistor is rendered conductive.

7. A battery charge indicating system according to claim 6, wherein said driving means comprises:
   a third transistor base of which is connected to said generator to be rendered nonconductive when said generator fails to generate the output; and
   a fourth transistor the base of which is connected to the collectors of said second and third transistors to be rendered conductive for activating said indicating means when said second and third transistors are rendered conductive and nonconductive, respectively.

8. A battery charge indicating system according to claim 7, wherein said generator control means comprises:
   a fifth transistor the base of which is connected to said first conductor means to be rendered conductive and nonconductive when the voltage of said battery applied through said first conductor means is above and below a preset value, respectively; and
   a sixth transistor the base of which is connected to said second conductor means and the collector of said fifth transistor, said sixth transistor being rendered conductive by the electric current supplied from said second conductor means when said fifth transistor is rendered nonconductive and said sixth transistor being rendered nonconductive when said fifth transistor is rendered conductive to bypass the electric current from said second conductor means therethrough.

9. A battery charge indicating system comprising:
   means including an alternating current generator and battery combination for
   charging said battery by the output of said generator,
   charge control circuit means operative upon receipt of power to control the charging of said battery around a predetermined voltage,
   indicating means,
   ON-OFF switch means connected between said indicating means and said generator battery combination,
   indicator control circuit means connected between said generator output and said indicating means and operative upon receipt of power to cause said indicating means to indicate when said generator fails to generate its said output, and
   means for supplying power through said switch means to both said charge and indicator control circuit means when said switch means is ON to cause both said control circuit means to be operative as aforesaid except when said power supplying means itself becomes disabled and fails to supply power to both said control circuit means even though said switch means is ON whereby said generator fails to generate its said output and said indicating means fails to indicate that said generator is not generating its output,
   said system being characterized by:
   additional means operative when said switch means is ON and said power supplying means is disabled as aforesaid for causing said indicating means to indicate that said generator is not generating its said output.

10. A battery charge indicating system according to claim 9, wherein said additional means includes:
    second power supplying means connected to said generator battery combination bypassing said switch means, and
    further circuit means connected between said second power supplying means and said indicator control circuit means and operative when said switch means is ON to supply power from said second power supplying means to said indicator control circuit means.

11. A battery charge indicating system according to claim 10, wherein said further circuit means includes a transistor having an emitter-collector path connected in series with said second power supply means and said indicator control circuit means and rendered conductive when said switch means is ON.

12. A system as in claim 9 wherein said additional means includes:
    detecting means for providing a given signal only when said switch means is ON, and
    second power supplying means connected directly to said battery generator combination and operative in response to said given signal for supplying the said power required by said indicator control circuit means to cause said indicating means to indicate a generator output failure.

13. A system as in claim 12 wherein said second power supplying means includes second switch means connected between said generator battery combination and said indicator means for delivering said required power to the indicator means when the second switch means is turned on,
    said detecting means including transistor means connected between the first mentioned and second switch means for turning on the latter when the former is ON as aforesaid.

* * * * *